United States Patent [19]
Bjorkman

[11] 3,772,085
[45] Nov. 13, 1973

[54] METHOD AND APPARATUS FOR IMPROVING EFFICIENCY OF HIGH ENERGY DENSITY BATTERIES OF METAL-METAL HALIDE-HALOGEN TYPE BY BOUNDARY LAYER

[75] Inventor: Harry K. Bjorkman, Birmingham, Mich.

[73] Assignee: Occidental Energy Development Company, Madison Heights, Mich.

[22] Filed: Nov. 18, 1971

[21] Appl. No.: 199,911

[52] U.S. Cl............................................ 136/86 A
[51] Int. Cl...................... H01m 31/00, H01m 29/02
[58] Field of Search ................ 136/86 A, 86 S, 159, 136/160

[56] References Cited
UNITED STATES PATENTS
2,921,110   1/1960   Crowley et al..................... 136/86 A
3,227,585   1/1966   Langford et al.................. 136/86 E Primary Examiner—A. B. Curtis
Assistant Examiner—H. A. Feeley
Attorney—William J. Schramm

[57] ABSTRACT

Efficiencies of high energy density batteries having metal and halogen electrodes and aqueous metal halide electrolyte are improved by creating a boundary layer of electrolyte low in halogen content adjacent to the metal electrode. Such boundary layer or stagnant electrolyte prevents contact of the metal electrode with halogen from a first flow of electrolyte containing dissolved halogen which passes through the base of the halogen electrode. When the cell is vertical, best formation of the boundary layer is obtained when the second flow of electrolyte enters the bottom of the cell and is directed upwardly and toward the halogen electrode with a horizontal velocity component equal to that of the first electrolyte flow entering the reaction zone.

In preferred embodiments of the invention the cell comprises bipolar electrodes of zinc and a porous carbon base for the halogen, the halogen is chlorine and the electrolyte is aqueous zinc chloride.

10 Claims, 4 Drawing Figures

3,772,085

METHOD AND APPARATUS FOR IMPROVING EFFICIENCY OF HIGH ENERGY DENSITY BATTERIES OF METAL-METAL HALIDE-HALOGEN TYPE BY BOUNDARY LAYER

BACKGROUND OF THE INVENTION

In the operation of high energy density batteries of the secondary type, wherein halogen is caused to flow past an electrode base surface, creating a halogen electrode, it has been found that inefficiencies in the production of electric current often result. Such inefficiencies and productions of lesser currents by these batteries appear to be attributable to direct chemical reaction of the halogen with the metal on the surface of the other electrode of the cells. The reaction takes place at the surface of the immobile material, the metal.

In diaphragm cells thin membranes of electrolyte-pervious material are positioned between the anode and the cathode and the use of such diaphragms in the present cells can prevent most contacts of elemental halogen with the metal electrode. However, physical difficulties of construction, saggings and breakings of the diphragms with time, and their changes in permeability during use often make them impracticable for the compact, thin, flat, bipolar electrode cells. Consequently, other mechanisms have been discovered and investigated in an effort to prevent undesirable contacts of halogen and metal, without the use of physical barriers between the electrodes.

SUMMARY OF THE INVENTION

This invention relates to diaphragmless secondary cells for high energy density electric batteries in which the contact of halogen with a metal electrode is prevented by utilization of a stream or flow of electrolyte, which may be of lower halogen content than the main electrolyte flow and which is so directed into the cell as to counteract an appropriate velocity component of the main stream and prevent the electrolyte and halogen of that stream from impinging on the electrode.

In accordance with the present invention, a diaphragmless secondary cell for a high energy density electric battery comprises a cell frame, a metal electrode held to said frame, a supporting conductive electrode base joined to the frame, means for contacting the supporting conductive base with a halogen, aqueous metal halide electrolyte between the electrode and the electrode base wherein the metal is that of the metal electrode and the halide is that of halogen, means for moving the electrolyte past the supporting electrode base and means for flowing an additional quantity of electrolyte so as to produce a total electrolyte flow at a low Reynolds number adjacent to the metal electrode to create a boundary layer of electrolyte thereon which limits contact of the halogen with the metal electrode. In preferred embodiments of the invention a non-metal electrode base is of porous carbon, the metal electrode is zinc on graphite and the aqueous electrolyte is zinc chloride. Also, it is preferable that the second flow of electrolyte enter at the bottom of the vertical cell and be directed at an angle of 5° to 30° from the vertical so as to neutralize any horizontal flow component of a first electrolyte flow into the cell reaction zone from the porous carbon electrode base.

DESCRIPTION OF THE PREFERRED EMBODIMENTS

The present invention and its mode of operation will be readily apparent from the following description, taken in conjunction with the accompanying drawing, in which.

Figure 1:
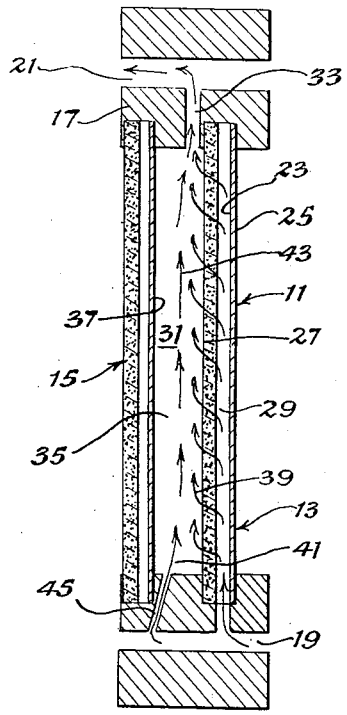
FIG. 1 is a central vertical section of a diaphragmless secondary cell for a high energy density electric battery, with the flows of electrolyte being indicated.

Electrolytic cell 11 includes two bipolar electrodes 13 and 15 held together in a frame 17 and communicating through it with an electrolyte inlet duct 19 and an outlet manifold 21. Electrodes 13 and 15 each have a gas impervious and electrolyte-impervious wall 23 of graphite or other conductive support or base material, which extends vertically, and on the outer surface of which is layer or coating 25 of a metal, preferably zinc. The inner surface of the wall is cemented or otherwise tightly joined to a perforated or porous base 27 for an electrode, preferably of porous carbon. Together the impermeable supporting electrode part and the perforated or porous part define a plurality of passageways 29 running parallel to each other and vertically through the bipolar electrode. Electrolyte 31, indicated in the reaction zone between the metal and porous or perforated carbon electrodes, passes into such zone from inlet duct 19, passageways 29 and through the base 27. Then, it passes out exit 33 and out manifold duct 21, from which it may be recycled back to the electrode. In the preferred embodiment of the invention wherein the metal electrode is zinc and the electrolyte is aqueous zinc chloride containing elemental or gaseous chlorine, it has been noted that when the overall Reynolds number of the flow through the reaction zone 35 is low, indicating, non-turbulent flow, the dissolved chlorine still reaches the zinc electrode 37 and chemically attacks it, causing a lowering of efficiency. Apparently, the transverse or horizontal force, velocity or momentum given the electrolyte when it passes into the reaction zone from the chlorine electrode base is strong enough that some of the electrolyte penetrates the normal boundary layer or film one would hope to have protecting the zinc. The disadvantage of chemical attack on the zinc is also noted when the cell is being charged, during which period gaseous chlorine is produced at the porous carbon electrode and is carried with electrolyte penetrating the layer about the metal electrode. In fact, it has been considered that the chemical attack on the zinc may be more serious during charging but any such attack during discharge shortens the effective useful life of the battery and therefore, from the consumer's viewpoint, it is more detrimental and should be avoided.

In accordance with the present invention it has discovered that in addition to the first or main electrolyte portion being charged to the reaction zone through the porous base for the chlorine electrode, when a second portion, usually a minor proportion of electrolyte, is added to the reaction zone with a velocity or momentum component opposite to the horizontal component of the first electrolyte velocity or momentum, preferably equal to it (and sometimes greater than it), good streamline flow is obtained, turbulence and eddy currents are minimized and the electrolyte moves upwardly through the cell without producing detrimental boundary layer changes adjacent to the zinc electrode. Thus, there is produced a layer of stagnant electrolyte or a boundary layer against the zinc electrode and the chlorine, except for any that may be present in such layer initially, is prevented from contacting the zinc. It is desirable that the upward component of the velocity of the second portion of electrolyte should be that desired to give proper flow through the reaction zone.

As illustrated in FIG. 1, numeral 39 shows the direction of flow of the first electrolyte through the porous electrode into the reaction zone and arrow 41 indicates the inclination upward of the flow of the second portion of electrolyte. Arrows 43 indicate the resultant substantially vertical velocity. The second electrolyte portion flows through the same inlet duct 19 as is used for the main portion and then passes through an inclined entrance duct 45 which gives it the desired heading upward and toward the porous carbon electrode. It has been found that inclinations from the vertical from 5° to 30° are most preferred for the production of the best stagnant "lamina" along the zinc electrode. Means for creating the desired flow is a pump, not illustrated, or other suitable mechanism for circulating the electrolyte in the manner indicated.

It will be noted that at the top of the cell, passage 33 is located near to the inner side of the porous carbon electrode. This is found to be highly desirable to also promote the flow of electrolyte along such electrode and away from the zinc electrode. After flow from the cell to the manifold, the electrolyte may be recharged with chlorine and circulated back to the inlet duct. During the charging cycle, chlorine may be removed from the electrolyte and zinc chloride can be added to it.

Figure 3:
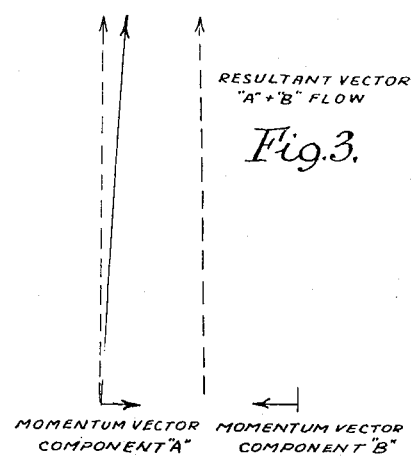
FIG. 3 is a flow vector diagram.

In FIG. 3 a vector diagram illustrates the neutralization of the horizontal component of the velocity or momentum of the first electrolyte portion by an equal and opposite component of the upwardly directed second electrolyte stream.

Figure 4:
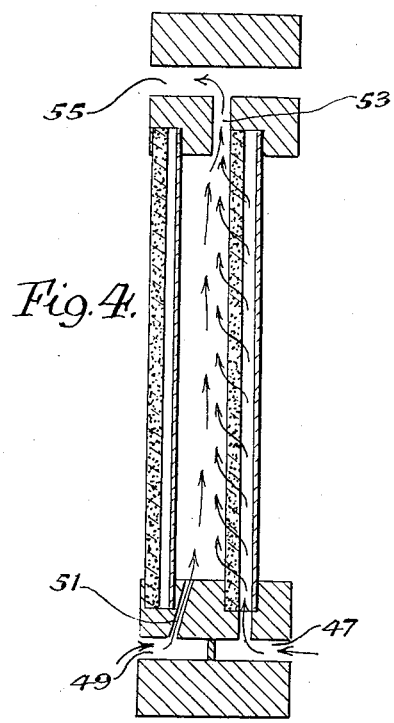
FIG. 4 is a vertical sectional view, corresponding to that of FIG. 1, but illustrating a modification of the cell to provide for an electrolyte of lower halogen content to be employed as that of the second electrolyte flow.

In FIG. 4 is shown a modification of the structure of FIG. 1 in which all elements are the same except for means provided to circulate an electrolyte containing less chlorine than that utilized in the process effected with the structure of FIG. 1. Of course, for charging the cell it will be unnecessary to utilize the structure of FIG. 4 and, although it is not necessary that it be used for discharging, it may sometimes be highly desirable. Thus, in FIG. 4, it is seen that separate provisions are made for entries of different types of electrolyte into the reaction zone. The first portion of electrolyte entering inlet duct 47 contains dissolved chlorine whereas that entering through duct 49 and passing through passageway 51, which second electrolyte will be closer to the zinc electrode, contains less dissolved chlorine or may even contain none of it. After the electrolyte is removed from the cell, through passage 53 and outlet manifold 55 it contains less dissolved chlorine and may be recycled back through duct 49 and passage 51, while another portion of this electrolyte may be recharged with chlorine and sent back to the cell through inlet duct 47 and the attendant passageways and pores through the porous carbon electrode. Of course, the structure of the apparatus of FIG. 4 is more complicated and often it will not be used, where the mechanism illustrated in FIG. 1 is sufficiently effective for the intended purpose.

In FIG'S. 1 and 4 the means for contacting a nonmetal conductive base with a halogen are passages or pores through the electrode base. Although the use of a porous electrode, preferably made from compressed and resin bonded activated carbon or graphite from which resin is subsequently removed, leaving the pores, is preferred, perforations may also be made in a more solid base, such as a graphite base. A graphite base is preferably used for deposition of the zinc electrode thereon. The flow of electrolyte containing chlorine through the base and the comparative dimensions of the reaction zone and inlet ducts and passageways are such that the overall Reynolds number in the reaction zone is less than 1,000, although even higher Reynolds numbers are ordinarily expected to yield non-turbulent flows. Strangely enough, it has been found to be desirable to have even lower Reynolds numbers, less than 100, preferably 1 to 100 and most preferably, about 1 to 20. Generally, it is more important that the Reynolds number be low when the cell is being discharged than when it is being charged. In most preferred embodiments of the invention the velocity will be such that the Reynolds numbers will be less than 10 during discharge and less than 20 during charging.

Instead of using a zinc electrode, other highly electropositive metals may be employed, such as nickel, chromium, iron, aluminum, copper, lead and magnesium. Instead of carbon and graphite electrode parts, stable and inert polymeric materials may be used, e.g., phenol formaldehyde resins, ABS resins, and natural and synthetic rubbers, e.g., chlorinated rubber. The important thing is that such materials should withstand the electrolyte and the halogen employed.

Instead of using zinc chloride and chlorine, zinc bromide and other metal bromides and bromine may be used but the chlorine-zinc chloride systems are highly preferred.

Various other materials which can be employed in making the structures of the present invention and various advantages thereof and of the bipolar electrodes and cells of this general design are described in another application for patent, filed the same day as the present application, and entitled BIPOLAR ELECTRODE FOR CELL OF HIGH ENERGY DENSITY SECONDARY BATTERY, of which the present inventor is a co-inventor. Such disclosure (Case U-10-033 U.S. Ser. No. 200,041) is now incorporated by reference in the present application. As in that application, the porous carbon employed has a porosity such that a cross-section thereof comprises from 20 to 80 percent carbon. The pores in or the passages through the porous carbon have an average diameter of 5 to 300 microns and a least transverse thickness between the passageways and the reaction zone of from 0.3 to 3 millimeters. The distance between the zinc electrode and the porous carbon base of the chlorine electrode is from 0.3 to 3 mm. and the zinc is from 25 to 4,000 microns thick. In the reaction or generating zone the path pursued by the electrolyte is substantially vertical, due to the inclination of the second portion of the electrolyte entering the zone. With the short distances between the electrodes the importance of utilizing this means for separating the chlorine from the zinc is evident, since any appreciable velocity of the entering first electrolyte would be likely to cause the chlorine content thereof to contact the zinc electrode.

Although, as illustrated, the electrodes are substantially vertical, as is the flow of electrolyte, in some embodiments it may be desirable to incline the cell from the vertical, even to have it substantially horizontal. In such cases, the present invention is still applicable, with the directions of flow being modified accordingly, with allowance for gravity effects.

The operation of the invention is considered to be evident from the foregoing description and the drawing. Those of skill in the art practicing the invention will learn from experience how to adjust the proportions of flows through the different passageways and how to set the angle of inclination of the second stream of electrolyte. Such angle may be set by employing rotatable nozzles or deflectors in the various channels, which may be adjusted in position. Also, in some cases it may be desirable to change the position of the entrance, preferably by moving it nearer to the zinc electrode. In other cases, a second entrance may be desirable to promote circulation at the non-metal electrode and cause better contact of chlorine with such electrode. That is, the stream may be directed at such an electrode to increase turbulence and prevent a stagnant boundary layer from forming thereon. However, this will usually not be necessary because of the sufficient turbulence caused by the electrolyte entering the reaction zone through the pores or perforations of the electrode. The second electrolyte stream is usually a minor proportion of the electrolyte flow and therefore, is usually at a higher compensating velocity, so that the horizontal component counteracts the first electrolyte velocity. Of course, inlet 51 for the second stream may be a single inlet or may be series of smaller inlets located along the length of the zinc electrode.

The zinc chloride will be a saturated or nearly unsaturated solution containing from 0.05 to 4 volumes of chlorine and will be at a temperature of 0° to 80°C., preferably from 15 to 40°C. Sometimes, instead of chlorine itself being present in the electrolyte, chlorine hydrate or other storage compound for chlorine may be present instead, preferably in a decomposing state.

The principal advantage of the present structure, in addition to increasing efficiency of charge and discharge of the cell and a battery made from it and similar cells, is that its effect is obtained without the use of diaphragms or other structures liable to deterioration or change in properties during use. The simple flows, structures and methods described are effective and the cells do not require tearing down periodically for replacement of worn out parts. Also, there is a minimum of cell volume lost to effective generation of electricity, since the boundary layer is very thin, usually being from 0.01 to 0.1 mm.

The following examples illustrate the operation of the present invention but do not limit it. It is clear that the structures and methods disclosed may be applied to other cells and batteries, such as those using various metals, halogens and oxygen as electrode materials. Also, the metal electrodes may be replaced, rather than recharged with metal, so the second electrolyte flow may be set for best discharge operation only. Unless otherwise indicated, all parts are by weight and all temperatures are in °C.

EXAMPLE 1

Following the teachings of U.S. patent application Ser. No. 50,054, now U.S. Pat. No. 3,713,888, for HALOGEN HYDRATES and an application for patent filed the same day as the present application, identified as Case No. U 10,033 U.S. Ser. No. 200,041 for BIPOLAR ELECTRODE FOR CELL OF HIGH ENERGY DENSITY SECONDARY BATTERY, in both of which applications the present inventor is a co-inventor, a diaphragmless secondary cell for a high energy density battery is constructed and is associated with other such cells to form a cell bank or battery. The construction of the cell is shown in FIG. 1 and is the same as the cell of the co-filed application except for the provision in the present case of a means for flowing electrolyte along the cathode to prevent the attack of chlorine on the zinc thereof. Thus, the electrodes are bipolar and comprise a negative electrode or cathode of zinc on graphite, with the zinc being about 200 microns thick and the graphite being about 0.5 millimeter thick. The porous carbon has pores in the 25 to 50 microns range, is of a porosity of about 45 to 50 percent and is about five times as thick as the graphite. The channels cut or molded into the porous carbon are about half the thickness thereof.

The electrolyte is aqueous zinc chloride which has a zinc chloride concentration of from 15 to 35 percent, usually being 15 percent at the beginning of discharge and the end of charge, and 35 percent after discharging and before charging. The electrodes have surface areas of about 170 square centimeters and are vertically positioned for best operations. The distance between the zinc electrode and the porous carbon base of the chlorine electrode is about 2 mm. in these flat cells and the flow rates of electrolyte through the porous carbon anode are about 600 milliliters per cell per minute on charge and 400 mls per cell per minute on discharge. The electrolyte temperature is about 30°C. and it contains about 70 volume per cent of chlorine (one volume of chlorine per volume of electrolyte). The materials of construction utilized are phenol formaldehyde for the base parts of the cell and an electrolyte-resistant cement for fastening the various parts together, which cement is preferably of the epoxy resin ester type (not amine cured).

Figure 2:
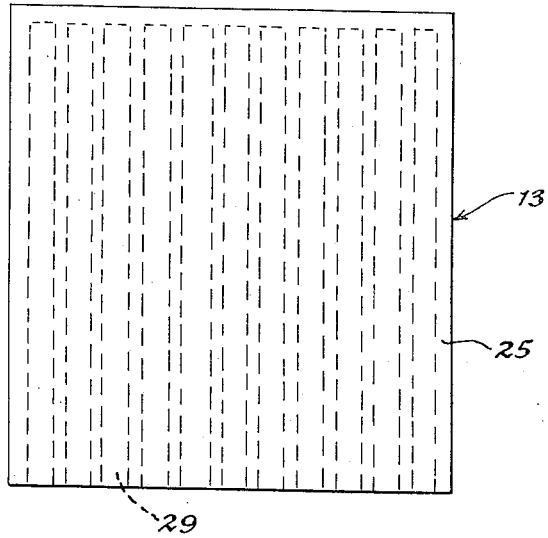
FIG. 2 is a side elevation of a bipolar electrode utilized, showing the passageways through which electrolyte travels.

The described cell is connected electrically in series with 23 other such cells so as to be capable of generating about 50 volts open circuit (40 volts at 8 amperes). The system is also connected so that electrolyte may be fed through the inlet manifold to each of the cells and out the outlet manifold. The electrode design of FIG. 2 is employed.

The cells of the battery are charged by passing a 15 percent zinc chloride aqueous solution through it at a flow of about 600 milliliters per cell per minute with application of the appropriate voltage, e.g., 50 volts, across the battery. Chlorine is generated at the anode and zinc is deposited on the graphite of the cathode. Such charging is continued for two hours, at which time the zinc has built up to about 200 microns thickness in a smooth deposit without appearance of dendrites or open areas on the electrode. In the absence of utilizing the boundary layer control passageway of this invention, as when such passageways are blocked, it is sometimes found that objectionable dendritic formations appear on the zinc of the cathode and, during discharge, bare areas are noted and uneven dissolving of the zinc results, causing a less efficient operation.

The inclination of the boundary layer control passageway is exaggerated in the drawing and is preferably at about 8° from the vertical, or just enough to counteract the horizontal momentum of the electrolyte penetrating the porous cathode. Relative volumes through the cathodes and the axiliary port vary but usually less than 10 percent of the electrolyte flow through the passageway designated as 51 will be sufficient, in the present case such proportion being about 5 percent. In some runs this is increased for the purpose of getting better circulation at the cathode but such operations have the disadvantage of also increasing turbulence in the cell, thereby carrying some chlorine back into contact with the zinc, which causes pitting, localized reactions and loss of power.

The boundary layer produced at the zinc surface by the described electrolyte flows is thin, usually being less than 0.1 mm., in the illustrated case being about 0.05 mm. The Reynolds number of flow adjacent the electrode is low, about 5 and almost always less than 100. During a similar discharging operation, the flow of electrolyte decreases approximately 50 percent.

The results of charging and discharging high energy density battery cells by the present invention are superior to results obtainable without the laminar flow of electrolyte in contact with the zinc electrode to place a non-stagnant but essentially slow moving film on it, protecting it from contact with chlorine passing through the porous electrode on discharge or generated at it on charge. The zinc electrodes are more even and are more capable of producing high amperage at the designated voltage than are those wherein dendrites or voids are present. Additionally, by the method of this invention only one source of flow is required, because the electrolyte forming the film protecting the zinc electrode comes from the same manifold as the active electrolyte cells.

EXAMPLE 2

The procedure of Example 1 is followed exactly, except for the utilization of the cell design of FIG. 4 in the high energy density batteries. As illustrated in FIG. 4, the electrolyte entering passageways 51 is lower in chlorine content than the cell electrolyte passing through the porous carbon electrode. Thus, the slight disadvantage of chemical reactions between the zinc of the electrode and chlorine in the electrolyte of the boundary layer is avoided. However, a separate tank and circulation system for the chlorine-free electrolyte is required and in some cases, additional pumping facilities may be desirable, although, as illustrated in the drawing, it is possible to utilize the pumping of the main body of electrolyte to create a suction which carries the supplementary electrolyte into the cell to form its protective boundary layer adjacent the zinc cathode.

When operating with the same flow rates mentioned in connection with Example 1, it is considered that the deposition of zinc during discharge is better than by following the procedure of Example 1 and similarly, the solubilizing of the zinc on discharge is more even.

The invention has been described with respect to illustrations and examples thereof but it is clear that it is not to be limited to these because equivalents may be substituted for elements or steps in the invention without departing from the spirit of the invention or going beyond its scope.

What is claimed is:

1. A diaphragmless secondary cell comprising a cell frame having an inlet means and an outlet means, a metal electrode held to said frame, a porous supporting conductive halogen electrode joined to the frame and spaced from the metal electrode, thereby forming an intercell spacing, said cell frame outlet means being positioned between the metal electrode and said halogen electrode of the cell, means for passing an aqueous metal halide electrolyte containing halogen into the cell frame inlet means, contacting the halogen electrode by passing the electrolyte through the porous halogen electrode, into the intercell spacing and out the cell frame outlet means, a second cell frame inlet means positioned adjacent to the metal electrode and spaced between the metal electrode and the halogen electrode in the intercell spacing and inclined at an angle of 5° to 30° from the metal electrode and means for passing electrolyte through the second inlet means towards the halogen electrode so as to produce a total electrolyte flow at a low Reynolds number adjacent to the metal electrode and to create a boundary layer of electrolyte thereon which limits contact of the halogen with the metal of the electrode.

2. A cell according to claim 1, wherein the frame is of a synthetic organic plastic, the metal electrode is zinc, the halogen electrode is porous carbon, the means for contacting the halogen electrode with halogen includes passageways for the halogen through the halogen electrode and the aqueous metal halide is zinc chloride.

3. A cell according to claim 1, wherein the metal of the metal electrode is affixed to the front of a carbonaceous substrate; the back of the carbonaceous substrate is attached to the back of a second halogen electrode of a second cell while the back of the halogen electrode is attached to the back of a second carbonaceous substrate for the metal electrode of a third cell; the passageways for electrolyte are between the back of each of the halogen electrodes and the back of each of the carbonaceous substrates of the respective metal electrodes; the electrodes are bipolar; the path pursued by the electrolyte through the first cell inlet means is through the passageways and through the porous halogen electrode while the flow of electrolyte through the second cell inlet means is directed upwardly and towards the porous halogen electrode so as to produce a vertical flow vector.

4. A plurality of cells according to claim 1, electrically connected to form a battery, with manifolds connecting electrolyte inlets and outlets of the cells.

5. A method of maintaining a boundary layer of an electrolyte adjacent to a metal electrode in a diaphragmless secondary cell having a cell frame having an inlet and outlet means, a metal electrode held to said frame, a porous supporting conductive halogen electrode joined to the frame and spaced from the metal electrode, thereby forming an intercell spacing, said cell frame outlet means positioned between the metal electrode and the halogen electrode of the cell, a second cell frame inlet means positioned adjacent to the metal electrode and spaced between the metal electrode and the halogen electrode in the intercell spacing and inclined at an angle of 5° to 30° from the metal electrode which comprises the steps of: (1) passing a halogen containing aqueous metal halide electrolyte into said cell through the first cell frame inlet means, through the porous halogen electrode; (2) flowing electrolyte into said cell through the second cell inlet means with such a velocity as to counteract the flow of said halogen containing electrolyte from said first inlet means in the direction of the metal electrode, thereby insulating the metal electrode from the dissolved halogen containing electrolyte and (3) forcing both portions of the electrolyte through the cell and out of the cell frame outlet means.

6. The method according to claim 5, wherein the cell is substantially vertical, the metal electrode is zinc on the front of a carbonaceous substrate, the back of the substrate being attached to the back of a second porous halogen electrode of a second cell, while the back of the halogen electrode is attached to the back of a second carbonaceous substrate of a second metal electrode of a third cell, the halogen is chlorine, the electrolyte is aqueous zinc chloride containing dissolved chlorine, the electrodes are bipolar, passageways are formed between the back of the carbonaceous substrate of the metal electrodes and the porous carbon chlorine electrodes, wherein the electrolyte through said first inlet means enters the cell with a substantially horizontal velocity after passing through the chlorine electrode and the electrolyte through said second inlet means enters the cell with upward and horizontal velocity components so as to substantially neutralize the horizontal velocity component of the electrolyte through said first inlet means and move the electrolyte vertically past the zinc electrode at a Reynolds number less than 100, and thereby insulate the metal electrode from the chlorine of the electrolyte from said first inlet means and maintain a boundary layer adjacent to the zinc electrode.

7. The method of claim 6, wherein the electrolyte flowing into the first and second cell inlet means is from a common manifold means.

8. A method according to claim 6 wherein the electrolyte flow passing through said first inlet is substantially horizontal in the direction of the zinc electrode, the electrolyte flow passing through said second inlet is at 5° to 30° from the vertical, and the velocity of the electrolyte through said second inlet is greater than that of the electrolyte from said first inlet.

9. A method according to claim 8, wherein the electrolyte passing through said second inlet enters the reaction zone of the cell at the bottom thereof adjacent to the zinc electrode.

10. A method according to claim 9, wherein the electrolyte passing through said second inlet is of a lower elemental chlorine content than the electrolyte passing through said first inlet.

* * * * *